United States Patent
Yoon et al.

(10) Patent No.: US 7,487,914 B2
(45) Date of Patent: Feb. 10, 2009

(54) HYBRID TAG INTERFACE SYSTEM AND METHOD USING THE HYBRID TAG INTERFACE

(75) Inventors: Hyung Min Yoon, Seoul (KR); Hyun Gu Shin, Suwon (KR); Chang Su Lee, Seoul (KR); Tack Don Han, Seoul (KR)

(73) Assignee: Colorzip Media, Inc., Seoul (KR)

( * ) Notice: Subject to any disclaimer, the term of this patent is extended or adjusted under 35 U.S.C. 154(b) by 61 days.

(21) Appl. No.: 11/658,158

(22) PCT Filed: Jul. 22, 2005

(86) PCT No.: PCT/KR2005/002385

§ 371 (c)(1), (2), (4) Date: Jan. 23, 2007

(87) PCT Pub. No.: WO2006/011729

PCT Pub. Date: Feb. 2, 2006

(65) Prior Publication Data

US 2007/0241196 A1   Oct. 18, 2007

(30) Foreign Application Priority Data

Jul. 27, 2004  (KR) ............... 10-2004-0058790

(51) Int. Cl.
*G06K 7/00* (2006.01)
(52) U.S. Cl. .............. 235/440; 235/439; 235/435; 235/486
(58) Field of Classification Search ............. 235/440, 235/492, 487, 470, 462.01, 435, 439, 486
See application file for complete search history.

(56) References Cited

U.S. PATENT DOCUMENTS

| 2002/0065680 | A1* | 5/2002 | Kojima et al. ............... 705/1 |
| 2002/0113127 | A1  | 8/2002 | Takeuchi et al. |
| 2005/0284941 | A1* | 12/2005 | Lubow ............... 235/462.01 |

FOREIGN PATENT DOCUMENTS

| EP | 0 986 020 | 3/2000 |
| WO | WO 0048115 | 8/2000 |
| WO | 2004/059563 | 7/2004 |

OTHER PUBLICATIONS

European Search Report for PCT/KR2005/002385 mailed Aug. 29, 2007.
International Search Report for PCT/KR2005/002385 mailed Nov. 21, 2005.

* cited by examiner

*Primary Examiner*—Edwyn Labaze
(74) *Attorney, Agent, or Firm*—Nixon & Vanderhye, PC

(57) ABSTRACT

A hybrid tag interface system and an interfacing method therefor are provided. First codes for an object from a wireless recognition tag containing the first codes are received through wireless communication, a second code for the object from an image tag expressing the second code by using a 1- or 2-dimensional image is read through optical contact, and then information on the object is calculated from the first codes and the second code based on their correlation. By doing so, automatic recognition and visibility can be maximized using the hybrid tag combining a wireless recognition tag and an image tag.

11 Claims, 5 Drawing Sheets

PRIOR ART

FIG. 1D

| CLASSIFICATION | CHARACTERISTICS | IMAGE TAG | | RFID |
|---|---|---|---|---|
| | | BAR CODE | COLOR CODE | |
| TECHNICAL CHARACTERISTICS | TYPICAL READ RANGE | CLOSE | CLOSE | • PASSIVE RFID<br>LF 134.2kHz: 1.5m<br>HF 13.56MHz: 1.0m<br>UHV 868MHz (EU): 0.9m<br>UHV 915MHz (US): 3m<br>MW 2.45GHz (EU): 0.5m<br>MW 2.45GHz (US): 2.0m |
| | ON PAPER | YES | YES | LABEL SHAPE (FLEXIBLE TAG) CAN BE ATTACHED TO THICK PAPER (80μm OR THICKER) |
| | WASHABLE/ USABLE IN RAINY WEATHER | YES (FOR MEDIA SUCH AS CLOTHES AND PLASTIC) | YES (FOR MEDIA SUCH AS CLOTHES AND PLASTIC) | ANTENNA/CHIP MAY BE DAMAGED BY INTENSE CLEANING. USABLE OUTDOORS IN RAINY WEATHER |
| | ROBUSTNESS (IMPACT, TEMPERATURE, HUMIDITY) | VARYING WITH RESPECT TO PRINTING MEDIUM (NOT AFFECTED BY IMPACT) | VARYING WITH RESPECT TO PRINTING MEDIUM (NOT AFFECTED BY IMPACT. PAPER MAY BE DISCOLORED BY TERMPERATURE) | RARELY AFFECTED BY IMPACT, TEMPERATURE, OR HUMIDITY |
| | TAG LIFE SPAN | VARYING WITH RESPECT TO PRINTING MEDIUM | VARYING WITH RESPECT TO PRINTING MEDIUM AND METHOD | SEMI-PERMANENT |
| | READER TYPE | DEDICATED READER | GENERAL PURPOSE WEB CAM, PDA, CAMERA PHONE, ETC | DEDICATED READER |
| RECOGNITION CHARACTERISTICS | READ SPEED | SLOW | SLOW | VERY FAST |
| | READING PENETRATION | IMPOSSIBLE IN OPAQUE OBJECT | IMPOSSIBLE IN OPAQUE OBJECT | POSSIBLE FOR GLASS, WOOD BUT NOT METAL |
| | READING INTERFERENCE (LIGHT, RADIO WAVES) | RARELY AFFECTED | AFFECTED BY LIGHT | AFFECTED BY SURROUNDING RADIO WAVES |
| | READING INTERFERENCE (TAG AND READER POSITIONS) | ERROR RATIO INCREASING BY ORIENTATION | ERROR RATIO INCREASING BY ORIENTATION | IF MULTIPLE TAGS WITHIN READING DISTANCE, INTERFERENCE OCCURS |
| DESIGN | AESTHETICS | BAD | GOOD | - |
| RECOGNITION CONVENIENCE/ USAGE CHARACTERISTICS | UNAUTHORIZED COPY/MODIFY | POSSIBLE | POSSIBLE | IMPOSSIBLE |
| | VISIBILITY/LINE OF SIGHT | NEEDED | NEEDED | NOT NEEDED |
| | TAG READ METHOD | MANUAL | MANUAL | AUTOMATIC |
| | AUTOMATIC TAG DISCOVERY | NO | NO | YES |
| | TRANSMISSION VIA INFORMATION DEVICE | POSSIBLE TO TRANSMIT USING FAX, EMAIL | POSSIBLE TO TRANSMIT USING FAX, EMAIL | IMPOSSIBLE |
| | GENERATION BY ORDINARY USER | POSSIBLE BY ORDINARY PRINTER | POSSIBLE BY ORDINARY PRINTER | RFID WRITER NEEDED/DIFFICULT USAGE |
| | INFORMATION STORAGE FUNCTION WHEN NECESSARY | IMPOSSIBLE | IMPOSSIBLE | RFID WRITER NEEDED/REWRITABLE RFID POSSIBLE |

FIG. 2

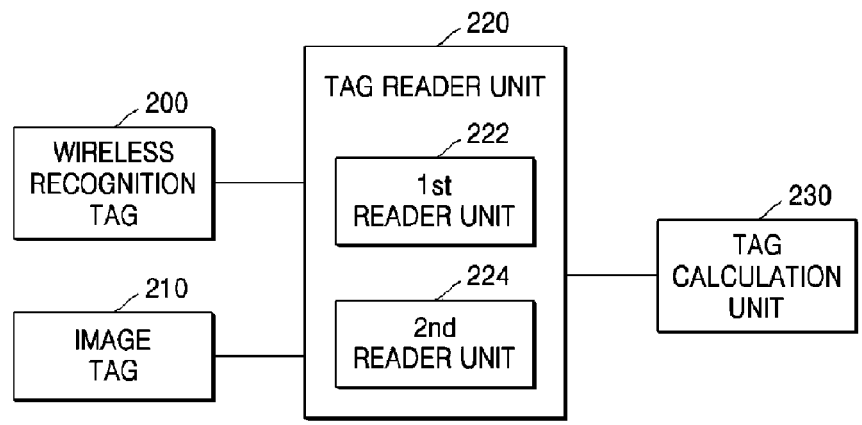

FIG. 3

| MODEL | RFID | | | IMAGE CODE | | AVAILABLE FUNCTIONS | |
|---|---|---|---|---|---|---|---|
| DUAL | READ ONLY | A XXXXX... | | A | A | COMPARE | COMPARISON OF RFID AND IMAGE CODE |
| PARTIAL | READ ONLY | A XBXCX... | | B | C | INDICATE | RFID: ACCESS ALL INFORMATION image: ACCESS INDIVIDUAL INFORMATION |
| RELATIVE | READ ONLY | A XXXXX... | | A' | A" | SECURE | DECRYPT ENCRYPTED RFID INFORMATION THROUGH IMAGE CODE |
| | READ ONLY | A XXBCX... | | A' | A" | CONVERT | EXTRACT INFOMRATION CORRESPONDING TO POSITION INFORMATION OF IMAGE CODE FROM AMONG A PLURALITY OF RFID INFORMATION ITEMS |
| REBIND | READ /WRITE | A XXXXX... | → A XXBCX... | B | C | ADD | ADD IMAGE CODE VALUE TO RFID INFORMATION |
| | READ /WRITE | A XXBCX... | → A XXDEX... | D | E | CHANGE | CONVERT AREA VALUE FROM AMONG RFID INFORMATION ITEMS INTO IMAGE CODE VALUE |
| | READ /WRITE | A XXBXC... | → A XXXXX... | B | C | DELETE | DELETE INFORMATION CORRESPONDING TO IMAGE CODE VALUE FROM AMONG RFID INFORMATION ITEMS |
| DISCRETE | READ ONLY | A XXXXX... | | B | C | – | – |

A: SERIAL NUMBER OF RFID
A', A": CODES RELATED TO A
B, C, D, E: USER CODES
X: NO DATA

FIG. 4

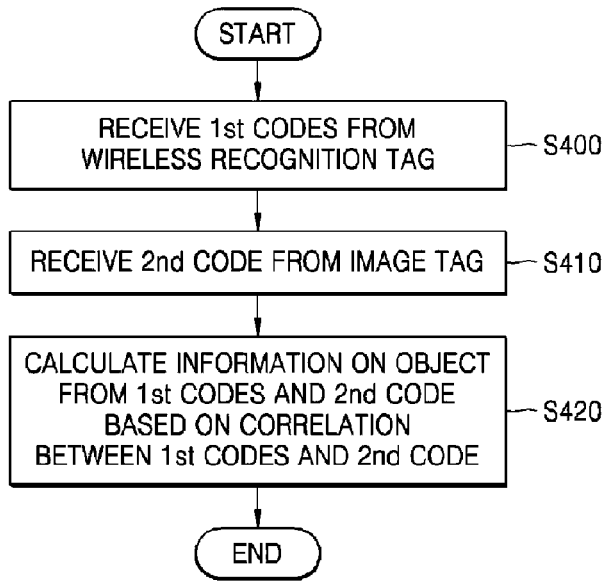

FIG. 5A

| MODEL | APPLICATION EXAMPLE |
|---|---|
| DUAL | RFID ATTACHED TO PRODUCT. IMAGE CODE ATTACHED TO CATALOGUE, MANUAL, WRAPPER |
| PARTIAL | RFID ATTACHED TO BOOKS AND PROVIDING GENERAL INFORMATION ON BOOK. IMAGE CODE ATTACHED TO PAGE OF BOOK, AND PROVIDING DETAILED INFORMATION ON CONTENTS OF BOOK |
| RELATIVE | A/S CENTER ACCESSES CUSTOMER INFORMATION THROUGH PRODUCT RFID AND IMAGE CODE OF PRODUCT QUALITY CERTIFICATE. CUSTOMER ACCESSES A/S INFORMATION THROUGH PRODUCT RFID AND IMAGE CODE OF RECEIPT |
| | IN PROCESS OF SHIPMENT, DISTRIBUTION, AND WAREHOUSING, IMAGE CODE OF PERSON IN CHARGE IS RECOGNIZED AND CONVERTED WITH RFID CODE OF EACH STEP TO ACCESS INFORMATION OF HANDLING DOCUMENT |
| REBIND | CHANGE RFID INFORMATION USING IMAGE CODE ATTACHED TO DOCUMENT - RFID ATTACHED TO PRODUCT - IMAGE CODE ATTACHED TO DOCUMENT INCLUDING QUALITY CERTIFICATE (CAN BE TRANSMITTED USING FAX) |
| DISCRETE | BOTH RFID AND IMAGE CODE ATTACHED TO PRODUCT - RFID PROVIDES PRODUCT INFORMATION SUCH AS SIZE, VOLUME, WEIGHT. IMAGE CODE PROVIDES SALES INFORMATION SUCH AS PRICE, SELLER, TELEPHONE NUMBER. |

FIG. 5B

| MODEL | APPLICATION EXAMPLE |
|---|---|
| DUAL | RFID (BOOK COVER) = IMAGE CODE (CATALOGUE, BOOK SEARCH COMPUTER SCREEN, NEW BOOK LIST) |
| PARTIAL | RFID (BOOKCOVER): OVERALL BOOK INFORMATION<br>IMAGE CODE (PAGE OF BOOK): DETAILED RELATED INFORMATION ON PART OF BOOK (TEXT, IMAGE, MOVING PICTURES, ETC.) |
| RELATIVE | RFID (ID CARD): USER INFORMATION, DECRYPTION KEY<br>IMAGE CODE (PAGES OF BOOK): ENCRYPTED INFORMATION SELECTIVELY PROVIDED TO AUTHORIZED USERS<br>– AUTHENTICATION USING RFID USER INFORMATION<br>– DECRYPTION OF ENCRYPTED INFORMATION WITH RFID KEY<br>– UNAUTHORIZED USER UNABLE TO ACCESS INFORMATION |
| REBIND | RFID (ID CARD): USER INFORMATION, BOOK LENDING LIST<br>IMAGE CODE (CATALOGUE, BOOK SEARCH COMPUTER SCREEN, NEW BOOK LIST)<br>– AFTER SEARCHING FOR BOOK IN CATALOGUE, WRITE DESIRED BOOK INFORMATION IN BOOK LENDING LIST OF RFID<br>– USE LENDING SERVICE OF BOOK REGISTERED IN BOOK LENDING LIST FROM LIBRARY |

FIG. 6

| CLASSIFICATION | CHARACTERISTICS | IMAGE TAG | RFID | HYBRID TAG |
|---|---|---|---|---|
| TECHNICAL CHARACTERISTICS | ROBUSTNESS (REPARABLE WHEN DAMAGED) | MID | LOW | HIGH (IN CASE OF DUAL TAG, AND RELATIVE TAG) |
| RECOGNITION CHARACTERISTICS | INTERFERENCE BETWEEN TAGS | LOW | HIGH | LOW (IN CASE OF DUAL TAG) |
| RECOGNITION CONVENIENCE | VISIBILITY/LINE OF SIGHT | NEEDED | NOT NEEDED | NOT NEEDED |
| | TAG READ METHOD | MANUAL | AUTOMATIC | MANUAL OR AUTOMATIC |
| | RECOGNITION DEVICE | GENERAL PURPOSE DEVICE (WHEN COLORCODE IS USED) | DEDICATED DEVICE | GENERAL-PURPOSE DEVICE (WHEN COLORCODE IS USED) |
| | TRANSMISSION VIA INFORMATION DEVICE | POSSIBLE TO TRANSMIT USING FAX, EMAIL | IMPOSSIBLE | POSSIBLE TO TRANSMIT USING FAX, EMAIL (IN CASE OF PARTIAL TAG, RELATIVE TAG) |
| | SECURITY | WEAK (POSSIBLE TO COPY) | MID | STRONG (IN CASE OF RELATIVE TAG) |
| | INFORMATION MODIFIABILITY | IMPOSSIBLE | POSSIBLE (IN CASE OF REWRITABLE RFID) | POSSIBLE (IN CASE OF REWRITABLE RFID) |

HYBRID TAG INTERFACE SYSTEM AND METHOD USING THE HYBRID TAG INTERFACE

This application is the U.S. national phase of international application PCT/KR2005/002385 filed 22 Jul. 2005, which designated the U.S. and claims priority of KR 10-2004-0058790, dated 27 Jul. 2004, the entire contents of each of which are hereby incorporated by reference.

TECHNICAL FIELD

The present invention relates to a hybrid tag interface system and an interfacing method, and more particularly, to a hybrid tag system which maximizes automatic recognition and visibility by combining a wireless recognition tag and an image tag, and a method using the hybrid tag.

BACKGROUND ART

The modern environment is becoming a ubiquitous computing environment of handheld and embedded computing devices, tag interfaces, and numerous service servers, with the rapid penetration of the Internet and mobile networks and combination of wireless networks. In this computing environment, physical objects are organically linked to digital information. Computers are embedded in the working environment of users, as hidden devices providing services, to establish a silent and seamless computing service environment so that users can access digital information smoothly.

With the development of this computing trend, a smooth connection of physical space and digital space based on a tag interface is emerging as an important field of ubiquitous computing, and a lot of research is under way in this area. In particular, research on tag usage in business models for fast settlement in a large market, in manufacturing processes, or in logistics networks, to take advantage of information using tags, is under way.

This system service development based on the tag interface is mainly being studied in relation to combining technologies with radio frequency identification (RFID), which is capable of replacing barcodes, because the tag itself is becoming smaller, cheaper, and more powerful. However, in order to form this system, a separate recognition device and associated equipment are needed, requiring a large initial investment. Also, there are other problems, such as interference in recognition, and restricted attachable media.

Here, the tag interface is an interface to link digital information present inside a computing environment and an object that exists physically. A variety of research projects to link the digital space inside the computing environment to the physical object using this interface are under way, in order to improve the computing environment of everyday life and make the environment more intelligent.

One type of input method to digitize physical information is keyboard or letter recognition, but the input speed is slow and a user's effort is required. Also, digitizing a large volume of information having a complex structure causes a long processing time and errors.

FIGS. 1A through 1C illustrate conventional image code tags. The barcode of FIG. 1A is produced in the form of an image, and is most widely used. A 2-dimensional (2D) barcode of FIG. 1B is developed in the form of a matrix based on the former barcode, and a colorcode of FIG. 1C takes the form of a matrix using 4 or more colors.

These are read by an optical recognition sensor such as a charge coupled device (CCD), and printed on paper, plastic wrapper, etc. The image code can be generated using an ordinary printer, and can be read by a dedicated device or a general-purpose device such as a webcam. However, in order to read the image code, the user should be able to see the code and confirm the position.

The barcode of FIG. 1A is the most widely used tag interface, and is mainly used in the fields of distribution and logistics. The barcode has a very high recognition rate, close to 100 percent, can be printed on documents, wrappers, etc., and can be reduced or magnified. The barcode is formed by arranging black lines of different widths at different intervals, and is read using a CCD or laser. The international standard code systems used for the barcode include European Article Number (EAN) and UPC.

The 1D barcode of FIG. 1A has high reliability for reading, employs a contactless reading method, and has simple codes which are easy to generate. However, the capacity of information (data) is small, the density of information storage is low, the types of information are limited, and in addition, when symbols are corrupted or damaged, it is difficult to read.

The 2D barcode of FIG. 1B is a new information medium generated to compensate for the weaknesses of the 1D barcode. As shown in FIG. 1B, the 2D barcode arranges data in the two directions (x direction, y direction) on a plane. The 2D barcode was first introduced in the mid-80's in order to compensate for the problem of limited data expressions of the conventional 1D barcode symbology, that is, the weakness that the expression of much information is impossible. In this sense, the 2D barcode has a concept of a portable data file, and also a concept of a data bridge, because it can play the role of a bridge for exchanging data between two computers that are not electrically connected. That is, a data file output from one computer system is expressed as symbols such that it can be input again to another computer system without keyboard input.

The colorcode of FIG. 1C can be read by a general-purpose device, such as a webcam, a scanner, and a camera phone, and has vast code area using colors and improved design. As shown in FIG. 1C (though it is expressed in monochrome but actually is formed with colors), the colorcode is a combination of differently colored cells.

If a set of color cells shows a result obtained by encoding specific information, the set is converted into bit information according to the red, green, and blue (RGB) values, and then used.

The usage method of the colorcode includes a direct colorcode model (DCM) method in which ASCII characters are all expressed through direct mapping according to the purpose, environment and user requests, and an indirect colorcode model (ICM) method in which only index information of data is contained and used in order to reduce the restriction by the performance requirement of a recognition device.

The colorcode of FIG. 1C is a next-generation code to express a variety of types of information on the Internet and under a network environment, and can link a variety of information items under a wired and wireless Internet environment. Also, since it is expressed by colors, it can easily attract the eye, and is superior in design such that the presence of the code can be clearly understood by users.

The colorcode is formed with a parity area for determining errors in recognition of the code, and a direction detection area for determining the rotation or the direction of the code. The colorcode is read by detecting the position of the cell, compensating for distortion, and checking errors with the parity, and therefore has a high recognition rate. In particular, the advantage of the colorcode is that it can be read by an ordinary camera or scanner.

Next, the RFID tag will be explained.

Unlike the image codes described above with reference to FIGS. 1A through 1C, the RFID tag uses a radio frequency in order to check the movement or transfer of products or persons, to trace other positions, and to confirm classification by type.

The RFID system is formed with a reader (or interrogator), a transponder, which is generally called a tag, and a computer or other computing devices capable of processing data.

According to the operation principle of the RFID, a tag generates a signal containing proper information, and a reader recognizes and analyzes this signal through an antenna, and obtains the information of the tag. This RFID can be roughly broken down into active RFID and passive RFID. With its own power generator embedded in the tag, the active RFID can read, write, and edit data, and has a bigger memory and a wider reception area. However, the tags are large and expensive, and have a limited lifetime.

The passive RFID is light, cheap, and has a long life span. However, since energy must be supplied from the reader in order to use the passive RFID, the recognition distance is short, and much power must be supplied to the reader. Most read-only tags employ the passive tags, in which 32 to 128-bit information that cannot be modified is programmed.

The recognition distance of the RFID varies greatly from several centimeters to tens of meters, with respect to the frequency usage area or the power consumption. The RFID can be read even when in motion. It is very difficult to counterfeit the unique ID given to an RFID in the manufacturing process. Also, since the RFID employs a contactless method, it is easy to carry the RFID. The RFID with a desired ID has flexibility such that the RFID can be produced in a variety of forms. The RFID can transmit information through a non-metal substance (glass, fiber, wood), so the RFID can even be read from inside a pocket or wallet. Since a radio wave is transmitted from an antenna or a reader, the RFID is less affected by the direction of information transmission.

FIG. 1D is a table comparing and analyzing the characteristics of tag interfaces.

The technological characteristics will now be explained. First, the type of media to which the tags can be attached will be explained. The image code can be used with all media on which the image code can be printed, such as paper and vinyl. An ultra-small RFID has been developed, with a size of 2 mm×2 mm×10 μm, but due to usage problems such as the recognition distance and interference between RFID tags, it has a drawback that it is difficult to attach to a very thin or small medium such as paper.

Secondly, robustness against an external environment will be explained.

This is again broken down into effects that can damage a tag itself, such as temperature, humidity, impact, folding, and water. The image code is printed on flexible paper, wrapper, plastic and the like, such that impact or a folding action rarely damages the image code. However, if rising temperature or humidity damages the medium, such as paper or plastic, on which the image code is printed, the image code can also be damaged. The RFID is rarely affected by temperature or humidity, and is robust against impact. Recently, flexible RFID tags have been produced. However, due to the antenna of the RFID, the RFID is weak against folding or wrinkling, for example, when washed. Unless physical damage occurs due to washing or the like, both types of tag interface are rarely affected by water. If the RFID is not waterproofed, it may operate incorrectly.

Next, recognition characteristics will be explained. In the case of a CCD-based recognition method, the image code is affected by light. In the case of a dedicated recognition unit, the barcode is affected a little by light due to its close distance recognition, but in case of a laser-based recognition unit, the barcode is rarely affected.

The colorcode is greatly affected by light because it uses a CCD-based general-purpose recognition unit, and in addition the colorcode itself is based on colors. The RFID is affected by a magnetic field in relation to the frequency band being used, and is very weak against frequency interference. If an opaque object is between the tag and the recognition unit, it is impossible to recognize the image code, but the RFID can be recognized unless the interfering object is metal.

Next, convenience of recognition will now be explained. Recognition of a tag (visibility) requires a user to know where the tag is attached and which tag is recognized by a reader. The barcode or the colorcode can be clearly confirmed, but it is difficult for a user to find the RFID because the RFID tag is hidden. Also in terms of recognition method the image code should be recognized by a user, but the RFID can be automatically recognized. As for device dependency, the barcode and the RFID need dedicated recognition device, but the colorcode has an advantage that it can be used with all devices with an attached camera. As for a recognition distance, the image code should be placed close to a user to be read, but the RFID can be read at tens of meters or more depending on the type of RFID.

As for the size and shape of tags in the design aspect, the size of the barcode or colorcode can be diversified but the shape must be rectangular. The size or shape of the RFID can be restricted by the antenna.

Aesthetics can be important to the user, and in this respect the colorcode can be regarded as superior because it employs a variety of colors.

Finally, as for usage characteristics, the image code can be generated and used conveniently by a user when necessary, using a general-purpose printer. The RFID needs a separate apparatus to record information. Also, the image code can be transmitted and received using a general-purpose device, such as a facsimile and a personal computer, a telephone, or a network.

DISCLOSURE OF INVENTION

Technical Solution

The present invention provides a hybrid tag interface system and method by which, using a hybrid tag combining a wireless recognition tag and an image tag, access to information which matches user requirements in a ubiquitous environment is made easier through automatic recognition of a wireless recognition tag and visibility of an image tag, Advantageous Effects According to the present invention, automatic recognition and visibility can be maximized, by using a hybrid tag combining a wireless recognition tag and an image tag.

DESCRIPTION OF DRAWINGS

FIG. 1D is a table comparing and analyzing the characteristics of tag interfaces;

FIG. 2 is a block diagram of a preferred embodiment of a hybrid tag interface system according to the present invention;

FIG. 3 is a table briefly showing correlations in a hybrid tag interface;

FIG. 4 is a flowchart of the operations performed by a preferred embodiment of a hybrid tag interface method;

FIGS. 5A and 5B are tables showing application examples of a hybrid tag interface system according to the present invention; and FIG. 6 is a table comparing application effects of the conventional tags with the hybrid tag according to the present invention.

BEST MODE

Figure 1A:
FIGS. 1A through 1C illustrate conventional tags.
Figure 1B:
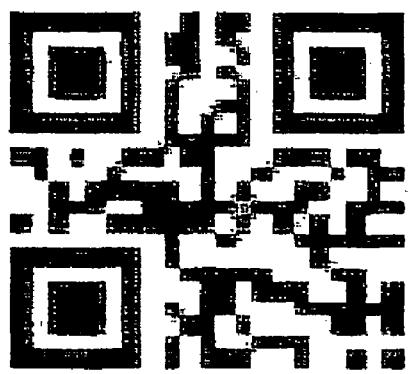
Figure 1C:
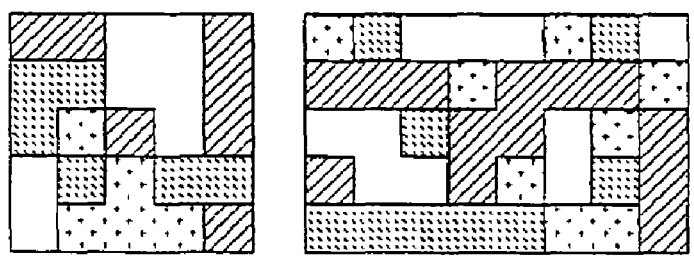
Figure 1C:
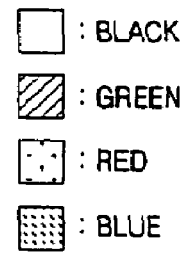

According to an aspect of the present invention, there is provided a hybrid tag interface system including: a wireless recognition tag which includes first codes for an object and transmits and receives the first codes through wireless communication; an image tag which expresses a second code for the object using a 1-dimensional (1D) or 2-dimensional (2D) image; a tag reader unit which transmits and receives the first codes of the wireless recognition tag and reads the second code of the image tag; and a tag calculation unit which calculates information on the object from the first codes and the second code based on the correlation between the first codes and the second code.

According to another aspect of the present invention, there is provided a hybrid tag interface method including: receiving first codes for an object from a wireless recognition tag containing the first codes, through wireless communication; reading a second code for the object from an image tag expressing second code by using a 1D or 2D image, through optical contact; and calculating information on the object from the first codes and the second code based on the correlation between the first codes and the second code.

Mode for Invention

The present invention will now be described more fully with reference to the accompanying drawings, in which exemplary embodiments of the invention are shown.

FIG. 2 is a block diagram of a preferred embodiment of a hybrid tag interface system according to the present invention. Referring to FIG. 2, the hybrid tag interface system according to the present invention is formed with a wireless recognition tag 200, an image tag 210, a tag reader unit 220, and a tag calculation unit 230.

The wireless recognition tag 200 is a tag transmitting and receiving data using an antenna included in the tag 200 itself.

The wireless recognition tag 200 transmits and receives signals using a radio frequency, and a leading example is an RFID tag.

The wireless recognition tag 200 stores first codes on an object. The first codes may be indexes indicating individual information items of the object, or may directly indicate information on the object. When the first codes are indexes, an external computing environment retrieves information corresponding to codes read from the wireless recognition tag 200.

The image tag 210 expresses a second code for an object using a 1D or 2D image.

The image tag 210 includes a 1D barcode, a 2D barcode, a colorcode, or other similar tag. The 2D barcode and the colorcode can contain more data than the 1D barcode.

The tag reader unit 220 is formed with a first reader unit 222 for reading the first codes from or writing the first codes to the wireless recognition tag 200, and a second reader unit for reading the second code of the image tag 210. More specifically, if the wireless recognition tag 200 enters a communication area, the first reader unit 222 reads the first codes stored in the wireless recognition tag 200. Also, the first reader unit 222 records codes in the wireless recognition tag 200 which has entered the communication area. The second reader unit 224 reads the image of the image tag 210 expressed on a plane by using optical devices such as a CCD, camcorder, and laser device. The second reader unit 224 recognizes the second code corresponding to the image.

The tag calculation unit 230 calculates information on the object from the first codes of the wireless recognition tag 200 and the second codes of the image tag 210 according to the correlation of the wireless recognition tag 200 and the image tag 210.

The correlations of the wireless recognition tag 200 and the image tag 200 include a dual tag relation, a partial tag relation, a relative tag relation, a rebind tag relation, and a discrete tag relation.

After defining information items for a hybrid tag interface here, a method of calculating information on an object according to the correlation between information items will now be explained.

$$I_{object} = \{i_n | n \geq 1 \text{ and } n \leq N, \text{ n is a natural number}\} \quad (1)$$

Here, N denotes the number of information types on an object, and $I_{object}$ denotes information related to the object.

Information items can be obtained by extracting them from an image code or an RFID, or by conversion. By using an image code, one information item can be obtained, and a job to obtain this is defined as $F_{IMAGE}(\ )$ $$I_t = F_{IMAGE}(\text{Image tag}) \text{ where } t \in \{1,2,\ldots,n\}, t \leq N \text{ and}$$
$$i_t \in I_{object} \quad (2)$$

Here, $i_t$ denotes information obtained from an image tag.

One or many information items stored in the RFID can be obtained; a job to obtain one information item is defined as $F_{RFID}$ (RFID), and a job to obtain many information items is defined as $F_{MRFID}(\ )$.

$$I_r = F_{RFID}(\text{RFID}) \text{ where } r \in \{1,2,\ldots,n\}, r \geq N \text{ and}$$
$$i_r \in I_{object} \quad (3)$$

Here, $i_r$ denotes one type of information obtained from the RFID.

$$I_R = F_{MRFID}(\text{RFID}) \text{ where } I_R = \{i_p | i_p \in I_{object}, p \geq 1 \text{ and}$$
$$p \leq N, \text{ p is a natural number}\} \quad (4)$$

Here, $I_R$ denotes the collection of information obtained from the RFID.

Also, since the RFID can change or add information, these jobs are defined as $F_{MRFID\_ADD}(\text{RFID}, \alpha)$, $F_{MRFID\_CHANGE}(\text{RFID}, \alpha)$, and $F_{MRFID\_DELETE}(\text{RFID}, \alpha)$.

$$I_{R'} = F_{MRFID\_ADD}(\text{RFID}, \alpha), \text{ where } I_{R'} \supset I_R, I_R \neq I_{R'} \text{ and}$$
$$\{\alpha\} I_{R'} - I_R \quad (5)$$

Here, $I_{R'}$ denotes the collection of information after executing the add command in the RFID.

$$I_{R''} = F_{MRFID\_CHANGE}(\text{RFID}, \alpha), \text{ where } I_{R''} \neq I_R, n(I_{R''}) =$$
$$n(I_R) \text{ and } \{\alpha\} = I_{R''} \cap I_R \quad (6)$$

Here, $I_{R''}$ denotes the collection of information after executing the change command in the RFID.

$$I_{R'''} = F_{MRFID\_DELETE}(\text{RFID}, \alpha) \text{ where } I_{R'''} \supset I_R,$$
$$I_{R'''} \neq I_R, \text{ and } \{\alpha\} = I_R - I_{R'''} \quad (5)$$

Here, $I_{R'''}$ denotes the collection of information after executing the delete command in the RFID.

The method of calculating information on the object according to the correlation between the wireless recognition tag (hereinafter referred to as an 'RFID tag') 200 and the image tag 210 will now be explained.

First, the dual tag relation case will be explained.

In the dual tag model, the RFID TAG 200 and the image tag 210 have identical code values. According to the visibility of the two tags and the characteristics and positions of the medium to which the two tags are attached, the two tags can perform a mutual compensation function. The dual tag model provides two functions, one of which is a compare function. The compare function reads the RFID and image tag at the same time or sequentially, compares the values, and returns a true or false result. The other is an assist function, by which when it is difficult to read one of the RFID and the image tag, or the reading of one fails, the other tag is read and the result is returned.

Compare Function:

$$F_{COMPARE}(\text{RFID, image tag}) = \text{Compare}(F_{RFID}(\text{RFID}), F_{IMAGE}(\text{image tag})) \text{ Result: True or False} \quad (8)$$

Assist Function:

$$F_{ASSIST}(\text{RFID, image tag}) = \text{If Fail } (F_{RFID}(\text{RFID})) \text{ then return}(F_{IMAGE}(\text{image tag})) \text{ Result: Fail or } i_{t \in Iobject} \quad (9)$$

Secondly, the partial tag relation will be explained.

The partial tag model uses an image tag in order to supplement a value on the RFID attached to a product. A representative function provided by this model is an indicate function. With this function, part of a value, which the RFID has, is indicated by the image code. If there is a restriction in the recognition environment of the RFID, or part of the data should be protected, this function is used to obtain only a required information value through the image tag. When RFIDs are close and affecting each other, it is difficult for the user to determine which tag is read. Accordingly, this function is useful particularly in a case where much information is desired to be provided through the tag in a very small product such as a book.

Indicate Function:

$$F_{INDICATE}(\text{RFID, image code}) = \text{If } F_{RFID}(\text{RFID}) \text{ include } F_{IMAGE}(\text{image tag}) \text{ then return } F_{IMAGE}(\text{image tag}) \text{ Result: Fail or } i_t \text{ where } i_t \in I_{object} \quad (10)$$

Thirdly, the relative tag relation will be explained.

In the relative tag model, the RFID tag 200 and the image tag 210 have different values and there is an inevitable correlation between these two values. The relative tag model includes a secure function and a convert function. When the RFID tag 200 has encrypted data and the image tag 210 has a key value for decrypting, the secure function decrypts the data using the two tags so that a user can obtain required information. Also, conversely, the RFID may have a key value for decrypting and the image tag may have encrypted information.

The convert function is similar to the secure function, but does not have the encryption or decryption function, and performs conversion, by performing a calculation, such as addition or subtraction, with the data of the RFID tag 200 using the code of the image tag 210.

Convert Function:

$$F_{CONVERT}(\text{RFID, image code}) = \text{Convert}(F_{MRFID}(\text{RFID}), F_{IMAGE}(\text{image tag})) \text{ Result: Fail or } i_c \text{ where } i_c \in I_{object} \quad (11)$$

Secure Function:

$$F_{SECURE}(\text{RFID, image code}) = \text{Decrypt}(F_{RFID}(\text{RFID}), F_{IMAGE}(\text{image tag})) \text{ Result: Fail or } i_s \text{ where } i_s \in I_{object} \quad (12)$$

Fourthly, the rebind tag relation will be explained.

In the rebind tag model, with a rewritable RFID tag 200, the image tag 210 adds, modifies, or deletes information of the RFID tag 200.

This model includes add, change, and delete functions. This model is used when a variety of information items occurring in a logistics chain are to be stored in a database through the image tag 210 and applied to the RFID tag 200.

Add Function:

$$F_{ADD}(\text{RFID, image tag}) = \text{Add}(F_{MRFID}(\text{RFID}), F_{IMAGE}(\text{image tag})) \text{ Result: } i_{R'} \text{ where } i_R \in I_{object} \quad (13)$$

Change Function:

$$F_{CHANGE}(\text{RFID, image tag}) = \text{Change}(F_{MRFID}(\text{RFID}), F_{IMAGE}(\text{image tag})) \text{ Result: } i_{R'} \text{ where } i_R \in R_{object} \quad (14)$$

Delete Function:

$$F_{DELETE}(\text{RFID, image tag}) = \text{Delete}(F_{MRFID}(\text{RFID}), F_{IMAGE}(\text{image tag})) \text{ Result: } i_{R'} \text{ where } i_R \in I_{object} \quad (15)$$

Finally, the discrete tag relation will be explained.

In the discrete tag model, the value of the RFID tag 200 and the value of the image tag 210 have no correlation. Here, a general recognition function (identify function) is provided. In this model, the RFID tag 200 stores important information items of a product, and the image tag 210 is used to provide information that has no direct relationship with the information of the RFID tag 200, but is additionally required for the product.

The correlations of the hybrid tag interfaces are briefly shown in FIG. 3.

FIG. 4 is a flowchart of the operations performed by a preferred embodiment of a hybrid tag interface method.

Referring to FIGS. 2 and 4, the tag reader unit 220 reads first codes stored in the wireless recognition tag (or RFID tag) 200 in operation S400.

If the wireless recognition tag 200 enters a communication area, the tag reader unit 220 automatically recognizes the wireless recognition tag 200 and writes code values to or reads code values from the wireless recognition tag 200. Accordingly, unlike the image tag 210, the user does not need to see the wireless recognition tag 200.

Also, the tag reader unit 220 reads the image of the image tag 210 and obtains the second code corresponding to the image in operation S410. The tag reader unit 220 reads the image of the image tag 210 expressed on a 2D plane through an optical contact (such as a CCD, camcorder, or laser device). Accordingly, in order to read the image of the image tag 210 through the tag reader unit 220, the user must visually identify the position of the image tag 210.

The tag calculation unit 230 calculates information on the object based on the correlation between the first codes of the wireless recognition tag 200 and the second code of the image tag 210 read by the tag reader unit 220 in operation S420.

For example, if the correlation is set such that the first codes are encrypted and stored, and the second code is used as a decryption key, the tag calculation unit 230 decrypts the first codes read from the wireless recognition tag 200, by using the second code of the image tag 210. Desired information from the object can be obtained from the decrypted first codes.

As another example, in the case of a correlation in which the second code is used to process values of the first codes, the tag calculation unit 230 can add a value corresponding to the second code to the first codes, or delete the value from the first codes, or convert the first codes based on the value. In particular, with this correlation, when in a logistics center, information on the next logistics center is desired to be stored in the wireless recognition tag, the next logistics center code can be added easily to the wireless recognition tag using an image tag having a code on the next logistics center.

FIGS. 5A and 5B are tables showing application examples of a hybrid tag interface system according to the present invention.

Referring to FIGS. 5A and 5B, in the hybrid tag interface system of the dual tag model, the RFID tag 200 is attached to a product and the image tag 210 is attached to a catalogue, manual, or wrapper related to the product. In this case, the user can obtain information on the product easily from the product, catalogue, and manual. In particular, by comparing the code value of the image tag 210 attached to the catalogue with the code value of the RFID tag 200 attached to the product, it can be confirmed whether or not the manual and catalogue are for that product. Also, in the dual tag model, the RFID tag 200 is attached to the cover of a book, and the image tag 210 is attached to a catalogue, a computer screen for book search, and a list of new books, and the two tags are made to provide an identical code.

In an application example of the partial tag model of the hybrid tag interface system, in the case of books, the RFID tag 200 is attached to the cover of a book, and through the RFID tag 200, general information on the book is provided. The image tag 210 is attached to each page of the book, and through the image tag 210, detailed information of the book is provided. Accordingly, the user can receive detailed information of the book through the image tag 210 attached to each page of the book, and general information of the book through the RFID tag 200 attached to the book cover.

In an application example of the relative tag model of the hybrid tag interface system, the RFID 200 is used as an identification card, that is, a decryption key, and the image tag is attached to a document or a page of a book, so that encrypted information can be selectively provided to an authorized user. Accordingly, when the contents of a page of wireless communication or a book is desired to be protected, the code of the image tag 210 is decrypted using the code value of the RFID tag 200 so that the user can receive data provided by the code of the image tag 210. Accordingly, an unauthorized RFID tag holder (that is, not having a legal decryption key) cannot decrypt the code of the image tag 210, such that the holder cannot access the data.

Also, in the relative tag model, an after-sales-service (A/S) center accesses customer information using the RFID tag 200 attached to a product and the image tag 210 attached to a quality certificate. The customer accesses A/S information through the RFID tag 200 attached to the product and the image tag 210 of the receipt.

Also, in the relative tag model, when a product is moving through the steps of shipping, distribution, and warehousing, a person in charge recognizes the image tag 210, converts it with the code of the RFID tag 200 corresponding to each step of the product, and accesses the information of the handling document.

In an application example of the rebind tag model of the hybrid tag interface system, the RFID tag 200 is used as an identification card including user information and book lending list information, and the image tag 210 is attached to a catalogue, a computer screen for book search, and a list of new books. Accordingly, when the user wants to borrow or return a book, by reading the image tag attached to the book, a code related to that book can be added or changed.

Also, in the rebind tag model, information stored in the RFID tag can be changed, by using an image code attached to a document. For example, the RFID tag 200 is attached to a product and the image tag 210 is attached to a document such as a quality certificate. The quality certificate to which the image tag 210 is attached can be transmitted using a facsimile.

In an application example of the discrete tag model of the hybrid tag interface system, both the RFID tag 200 and the image tag 210 are attached to a product. At this time, the RFID 200 provides information on the product, such as the size, volume, and weight of the product, and the image tag 210 provides sales information, such as the price, seller, and telephone number.

FIG. 6 is a table comparing application effects of the conventional tags with the hybrid tag according to the present invention.

First, as for the technological characteristics, the dual tag model supports greater robustness against the external environment. In the case of the dual tag model, if one tag is damaged, the other tag can replace it. Also, in the case of the relative tag model, when one tag is damaged, it can be recovered by using the code of a database and information of the other tag.

Next, as for the recognition characteristics, since the RFID tag 200 is read through radio waves, it has a drawback that when the RFID tags 200 are very close together, the user cannot determine which RFID tag is being read. Accordingly, when the partial tag model or the discrete tag model is used, the tag can be used irrespective of this interference. In case of a metal product, recognition of the RFID tag 200 can be interrupted by the volume or position of the product itself. However, in the dual tag model, the tag can be recognized, by compensating for this interference problem.

Finally, as for convenience of recognition and information security, the dual tag model and the partial tag model compensate for drawbacks of the image tag 210 and the RFID tag 200. The user can recognize the existence of a tag, and according to required information, a remote automatic recognition (RFID recognition) without the user's assistance, and manual recognition (image tag recognition), are available. Also, when the colorcode is applied to the hybrid tag, the tag can be recognized by a general-purpose apparatus.

The aspect of selective information access is about how much choice is given to the user by information access based on the tag. In the RFID tag 200, many codes can be stored, and these codes should be accessed conveniently by the user according to the purpose. In the partial tag model and the relative tag model, information can be added, modified, or deleted in the RFID tag 200, by using the image tag's superior transmission characteristics through the Internet or by facsimile. In the aspect of information security, the image code can be copied, and it is difficult to encrypt the code. The relative tag model provides a code system with strengthened security, by combining information items of the RFID tag 200 and the image tag 210. The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. While the present invention has been particularly shown and described with reference to exemplary embodiments thereof, it will be understood by those of ordinary skill in the art that various changes in form and details may be made therein, without departing from the spirit and scope of the present invention as defined by the following claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

The hybrid tag interface provides automatic recognition by a wireless recognition tag and visibility by an image tag at the same time, and sets the correlation between the wireless recognition tag and the image tag to provide robustness against the external environment, improved recognition characteristics, recognition convenience, and information security.

The invention claimed is:

1. A hybrid tag interface system comprising:
   a wireless recognition tag which includes first codes for an object and transmits and receives the first codes through wireless communication;
   an image tag which expresses a second code for the object using a 1-dimensional (1D) or 2-dimensional (2D) image;
   a tag reader unit which transmits and receives the first codes of the wireless recognition tag and reads the second code of the image tag; and
   a tag calculation unit which decrypts the first codes based on a key value for decrypting included in the second code and calculates information on the object from the first codes and the second code based on the correlation between the first codes and the second code.

2. The system of claim 1, wherein the wireless recognition tag is a radio frequency identification (RFID) tag.

3. The system of claim 1, wherein the image tag is any one of a 1D barcode, a 2D barcode and a colorcode.

4. The system of claim 1, wherein the tag reader unit comprises:
   a first reader unit which reads and writes the first codes through wireless communication with the wireless recognition tag positioned in a communication area; and
   a second reader unit which reads the image of the image tag through optical contact.

5. The system of claim 1, wherein the tag calculation unit extracts a code indicated by the second code, from among the first codes, and outputs information corresponding to the extracted code.

6. The system of claim 1, wherein the tag calculation unit converts the first codes based on the second code and calculates information on the object.

7. The system of claim 1, wherein based on the second code, the tag calculation unit coverts or deletes a code value from among the first codes, or adds a code value to the first codes.

8. A hybrid tag interface method comprising:
   receiving first codes for an object from a wireless recognition tag containing the first codes, through wireless communication;
   reading a second code for the object from an image tag expressing the second code by using a 1D or 2D image, through optical contact; and
   decrypting the first codes based on a key value for decrypting included in the second code and calculating information on the object from the first codes and the second code based on the correlation between the first codes and the second code.

9. The method of claim 8, wherein the calculation of the information comprises:
   extracting a code indicated by the second code, from among the first codes, and outputting the information corresponding to the extracted code.

10. The method of claim 8, wherein the calculation of the information comprises:
    converting the first codes based on the second code and calculating information on the object.

11. The method of claim 8, wherein the calculation of the information comprises:
    based on the second code, converting or deleting a code value from among the first codes, or adding a code value to the first codes.

* * * * *